US012745167B2

(12) United States Patent
Casati

(10) Patent No.: US 12,745,167 B2
(45) Date of Patent: Sep. 22, 2026

(54) METHODS AND APPARATUSES FOR ENABLING A USER EQUIPMENT TO REGISTER WITH MULTIPLE PUBLIC LAND MOBILE NETWORKS AND NON-PUBLIC NETWORKS USING THE SAME ACCESS TYPE

(71) Applicant: Nokia Technologies Oy, Espoo (FI)

(72) Inventor: Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 313 days.

(21) Appl. No.: 18/574,480

(22) PCT Filed: Jul. 6, 2022

(86) PCT No.: PCT/EP2022/068680

§ 371 (c)(1), (2) Date: Dec. 27, 2023

(87) PCT Pub. No.: WO2023/285224

PCT Pub. Date: Jan. 19, 2023

(65) Prior Publication Data

US 2024/0314678 A1 Sep. 19, 2024

Related U.S. Application Data

(60) Provisional application No. 63/222,106, filed on Jul. 15, 2021.

(51) Int. Cl.
*H04W 48/18* (2009.01)

(52) U.S. Cl.
CPC .................................. *H04W 48/18* (2013.01)

(58) Field of Classification Search
CPC .................................................... H04W 48/18
USPC ......................................................... 370/338
See application file for complete search history.

(56) References Cited

U.S. PATENT DOCUMENTS

2018/0092142 A1 3/2018 Han et al.
2019/0268752 A1* 8/2019 Buckley .................. H04W 8/06
2020/0053545 A1* 2/2020 Wong .................... H04W 76/27
2020/0359194 A1 11/2020 Kim et al.

FOREIGN PATENT DOCUMENTS

WO 2020/168049 A1 8/2020
WO 2022/208355 A1 10/2022

OTHER PUBLICATIONS

"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.

"3rd Generation Partnership Project; Technical Specification Group Core Network and Terminals; Non-Access-Stratum (NAS) functions related to Mobile Station (MS) in idle mode (Release 17)", 3GPP TS 23.122, V17.2.0, Mar. 2021, pp. 1-94.

(Continued)

*Primary Examiner* — Christopher R Crompton
(74) *Attorney, Agent, or Firm* — Nokia Technologies Oy

(57) ABSTRACT

Systems, methods, apparatuses, and computer program products for enabling a user equipment (UE) to register with multiple public land mobile networks (PLMNs) and non-public networks (NPNs) using the same access type are provided.

21 Claims, 6 Drawing Sheets

(56) References Cited

OTHER PUBLICATIONS

International Search Report and Written Opinion received for corresponding Patent Cooperation Treaty Application No. PCT/EP2022/068680, dated Oct. 12, 2022, 20 pages.
"3rd Generation Partnership Project; Technical Specification Group Services and System Aspects; Procedures for the 5G System (5GS); Stage 2 (Release 17)", 3GPP TS 23.502, V17.1.0, Jun. 2021, pp. 1-692.
"Dual Registration between two networks", 3GPP SA WG2 Meeting #145E, S2-2104126, Agenda: 9.1.4, Nokia, May 17-28, 2021, 2 pages.
"Support for dual registration via the same RAT", 3GPP TSG-SA2 Meeting #127, S2-183252, Nokia, Apr. 16-20, 2018, 4 pages.
"3rd Generation Partnership Project; Technical Specification Group Services and System Aspects; Service requirements for the 5G system; Stage 1 (Release 19)", 3GPP TS 22.261, V19.4.0, Sep. 2023, 135 pages.

* cited by examiner

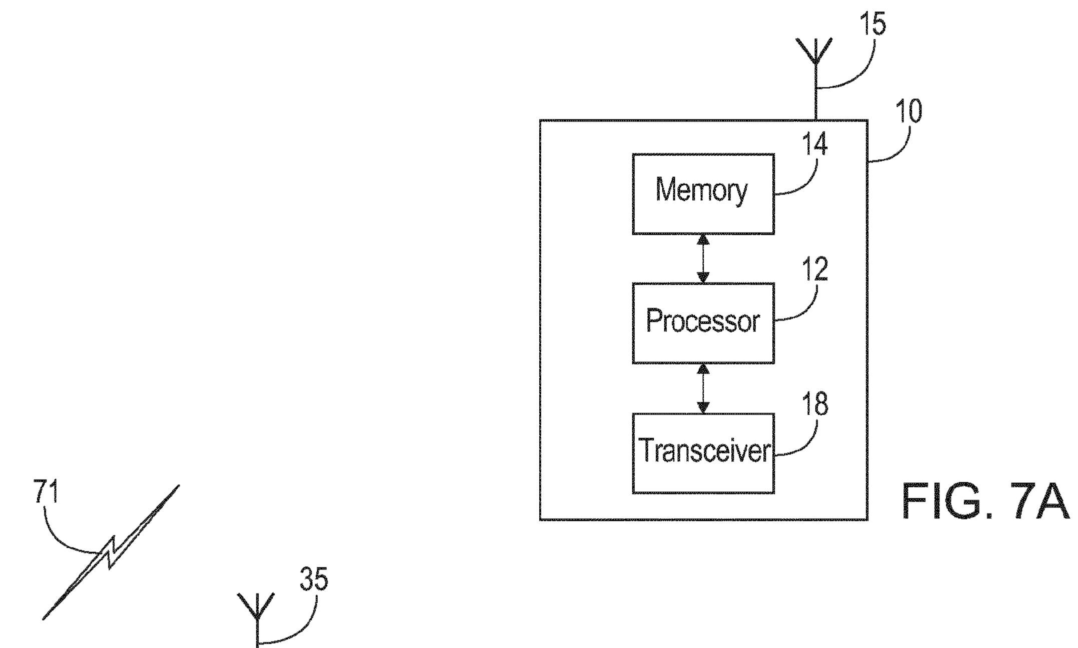
FIG. 7A
35
30
34
Memory
32
Processor
38
Transceiver
FIG. 7C
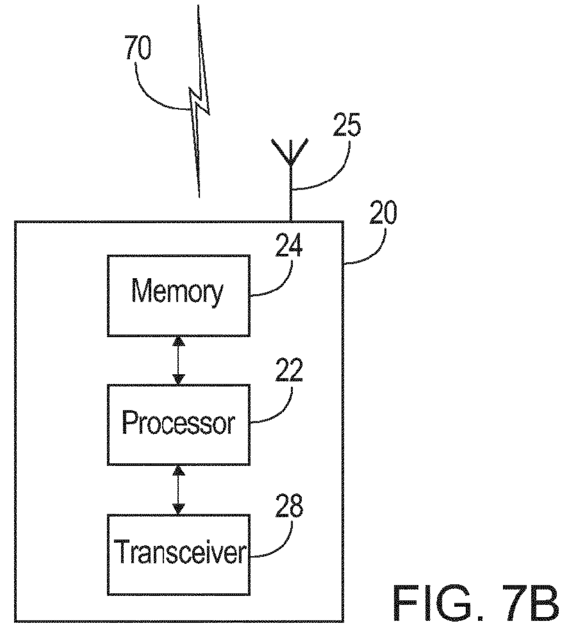
FIG. 7B

METHODS AND APPARATUSES FOR ENABLING A USER EQUIPMENT TO REGISTER WITH MULTIPLE PUBLIC LAND MOBILE NETWORKS AND NON-PUBLIC NETWORKS USING THE SAME ACCESS TYPE

RELATED APPLICATION

This application is a national stage application, filed under 35 U.S.C. § 371, filed as PCT Application No. PCT/EP2022/068680, filed on Jul. 6, 2022, which claims the benefit of U.S. Provisional Patent Application No. 63/222,106, filed Jul. 15, 2021, each of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for enabling a user equipment (UE) to register with multiple public land mobile networks (PLMNs) and non-public networks (NPNs) using the same access type.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 7A illustrates an example block diagram of an apparatus, according to an example embodiment;

FIG. 7B illustrates an example block diagram of an apparatus, according to an embodiment; and FIG. 7C illustrates an example block diagram of an apparatus, according to an example embodiment.

DETAILED DESCRIPTION

Figure 1:
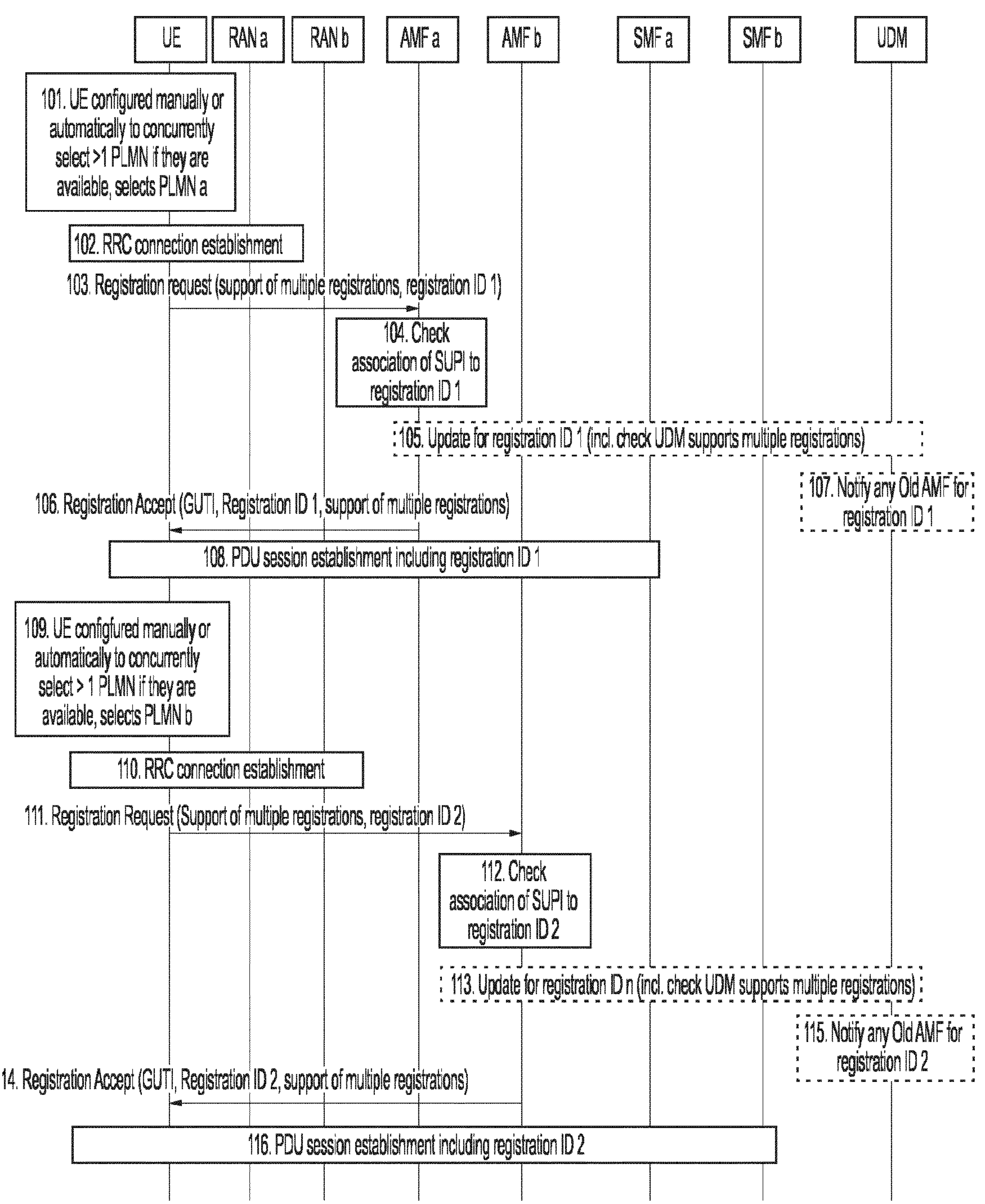
FIG. 1 illustrates an example signaling diagram, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enabling a user equipment (UE) to register with multiple public land mobile networks (PLMNs) and non-public networks (NPNs) using the same access type, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Currently, the 5$^{th}$ generation system (5GS) enables a UE to register simultaneously with a PLMN for 3$^{rd}$ generation partnership project (3GPP) access type and a PLMN for non-3GPP access type. This is because there is an assumption that the UE has a single radio resource control (RRC) connection and registration state in the 3GPP side and just one connection in the non-3GPP access side.

Proposals are provided to remove this limitation and allow a UE to be simultaneously registered with the same home public land mobile network (HPLMN) credentials over: two standalone non-public networks (SNPNs), one PLMN and one SNPN, or two PLMNs at the same time, using the same access type and potentially even the same cell (network sharing scenario).

Each UE registration is stored in the unified data management (UDM), but when a UE registers for a second PLMN/NPN it is not clear whether this is a second simultaneous registration or a replacement of the old registration with the new access and management function (AMF) registration information. In the former case, a second registered AMF for the same access type should be added and, in the latter, the registration state for the access type should be updated and the old AMF should be notified so it can cancel the locally stored UE context.

As will be discussed in detail below, according to certain example embodiments, a procedure is provided to enable a UE to register, using one universal subscriber identity module (USIM), with more than one network simultaneously using the same 3GPP access type.

According to one example embodiment, a UE may, with one credential (e.g., one USIM), access a first network (e.g., a PLMN) and, simultaneously or substantially simultaneously, access a second network (e.g., a SNPN). As one example, a UE may use IMS from the first PLMN and be registered with an enterprise network (SNPN) simultaneously.

According to an embodiment, a UE may be enabled to run simultaneous or substantially simultaneous registrations for the same access type for two PLMNs/NPNs, based on user settings or configuration.

In certain embodiments, the UE may be able to select a second PLMN/NPN for the same USIM on the same access type after having detected a first PLMN supports multiple registrations per access type. According to some embodiments, more than two PLMNs or NPNs can be considered for the same access type for generality (e.g., up to "n" supported by the UE, AMF and UDM).

In one embodiment, the UE may establish a RRC connection of any selected PLMN/NPN (the first one, or another one if all the PLMNs/NPNs have confirmed support of multiple registration before the current one).

According to certain embodiments, the UE may indicate that it supports multiple registrations per USIM/access type and indicate a registration identifier (set to 1 for the first registration for the access type, set to 2 for the second in the same access type and so on if more were supported). The registration ID is per access type, i.e., if a UE moves from one access type to another in the same PLMN, it may use a different registration ID in the different access types.

In an embodiment, the supporting AMF in the serving NPN/PLMN may be configured to check whether a UE context for the subscription permanent identifier (SUPI) exists for the registration ID that the UE provides. If the context already exists, the AMF does not need to contact the UDM and the AMF may keep a context for the SUPI per registration ID. If the AMF does not have the UE context for the UE with this registration ID, the AMF may report the registration to the UDM with the registration identifier provided by the UE. At this time, the PLMN/NPN may detect whether the UDM supports the feature of multiple registrations.

If the UDM does not support multiple registrations, the AMF may behave as if it does not support multiple registrations itself. However, if the UDM does support the feature of multiple registrations, the UDM may store the AMF address for this registration ID and may notify any previously registered AMF associated with the same registration identifier at the UDM that it can erase the UE context.

In an embodiment, if the serving PLMN/NPN AMF supports the feature and the UDM also supports the feature, the serving PLMN/NPN AMF may indicate, in a registration accept message, that it supports multiple registrations per USIM/Access type and confirms the registration with the globally unique temporary identifier (GUTI) for the registration and the registration ID. The same registration ID may be used in subsequent mobility registration updates. If the AMF and/or UDM do not support the feature, no registration ID is returned and the UE shall not use this new registration if it already had one or more other ones, or keep this registration and deregister with the other PLMNs/NPNs (based on its logic/policy/user preference and settings). According to an embodiment, the registration ID can also be included in session management messages (e.g., in the event that the two PLMN/NPNs provided access to the same network in the HPLMN/H-NPN).

In an embodiment where the UE is configured by the HPLMN to activate the multiple registration per access type, the UDM may be assumed by the UE to support the feature. Then, a lack of support indication by a PLMN or NPN means that the AMF does not support the feature. This can enable the UE to have configuration of multiple registrations per access type, where one of the registrations is with a PLMN or NPN that does not support the feature as the UDM can still support at most one registration per access type without a registration ID.

FIG. 1 illustrates an example signaling diagram depicting an example in which a UE completes registration with two supporting PLMNs, according to an embodiment. As shown in the example of FIG. 1, the signaling may involve a UE, RAN a, RAN b, AMF a, AMF b, SMF a, SMF b, and UDM. FIG. 1 illustrates an embodiment where the UE successfully registers with two supporting PLMNs (PLMN a and PLMN b) and the UE associates to each a registration ID (registration ID 1 and registration ID 2) for the 3GPP access type. In one embodiment, the UE may generate the registration IDs per access type and can reuse up to the "n" IDs it can support per access type. The value n may be defined by the standards, for example. When a registration for an ID ceases to exist, that ID can be reused.

As illustrated in the example of FIG. 1, at 101, the UE may be configured manually or automatically to concurrently select more than one PLMN if they are available. In this example, the UE may select PLMN a. At 102, RRC connection establishment may be performed between the UE and RAN a. As further illustrated in the example of FIG. 1, at 103, the UE may transmit, to AMF a, a registration request message indicating the UE's support for multiple registrations per USIM/access type and a registration ID 1. At 104, AMF a may check the association of SUPI to registration ID 1. In other words, AMF a may check whether a context for the SUPI exists for registration ID 1. If the context already exists, then AMF a does not need to contact the UDM and AMF a keeps a context for the SUPI per registration ID. However, if AMF a does not have a previous context for the UE with registration ID 1, then, at 105, AMF a may transmit an update to the UDM with registration ID 1 and detects whether the UDM supports multiple registrations. If the UDM does not support multiple registrations, then AMF a may act as if it also does not support multiple registrations.

As further illustrated in the example of FIG. 1, when registration ID 1 is accepted by the network, AMF a may transmit to the UE, at 106, a registration accept message including GUTI, registration ID 1, and an indication of support for multiple registrations. As shown at 107 of FIG. 1, if the UDM supports multiple registrations, the UDM may store the AMF address for the registration ID 1 and may notify any previously registered AMF associated with the same registration ID that it can erase the UE context. In an embodiment, at 108 of FIG. 1, PDU session establishment including registration ID 1 may be performed. For example, the PDU session may be established at 108 by reporting the registration ID 1 to the SMF.

According to certain embodiments, when the UE is configured to operate in multiple registration mode, it may attempt to detect whether the multiple registrations can be supported if it is set to select multiple PLMNs based on local policy or settings and user preferences. When the registration ID is accepted by the network, such as in procedure 106 of FIG. 1, then the UE can proceed to consider adding more PLMNs registrations. For example, as shown at 109, the UE may be configured manually or automatically to concurrently select more than one PLMN if available, and may select PLMN b. At 110, RRC connection establishment may be performed between the UE and RAN b.

In an embodiment, at 111, the UE may transmit, to AMF b, a registration request message indicating the UE's support for multiple registrations per USIM/access type and a registration ID 2. At 112, AMF b may check the association of SUPI to registration ID 2. For instance, AMF b may check whether a context for the SUPI exists for registration ID 2. If the context already exists, then AMF b does not need to contact the UDM and AMF b can keep a context for the SUPI per registration ID. However, if AMF b does not have a previous context for the UE with registration ID 2, then, at 113, AMF b may transmit an update to the UDM with registration ID 2 and can detect whether the UDM supports multiple registrations. If the UDM does not support multiple registrations, then AMF b may act as if it also does not support multiple registrations.

As further illustrated in the example of FIG. 1, when registration ID 2 is accepted by the network, AMF b may transmit to the UE, at 114, a registration accept message including GUTI, registration ID 2, and an indication of support for multiple registrations. As further illustrated at 115 of FIG. 1, if the UDM supports multiple registrations, the UDM may store the AMF address for the registration ID 2 and may notify any previously registered AMF associated with the same registration ID that it can erase the UE context. In an embodiment, at 116 of FIG. 1, PDU session establishment including registration ID 2 may be performed. For example, the PDU session may be established at 116 by reporting the registration ID 2 to the SMF. Since the SMF can be in the HPLMN in a roaming scenario, this reporting helps to discriminate the PDU sessions per registration ID. Since the registration to multiple PLMNs is not supported in EPS, the PDU sessions with this ID cannot be handed over to EPS unless just one PLMN receives an indication to do so from UDM.

It is noted that, if the UDM and/or AMF do not support multiple registrations, then the UE would not receive the registration ID confirmation provided in procedures 106 or 114 of FIG. 1, since the AMFs and/or UDM do not support the multiple registrations.

As described above, FIG. 1 is provided as one example. However, other examples are possible, according to some embodiments.

Figure 2:
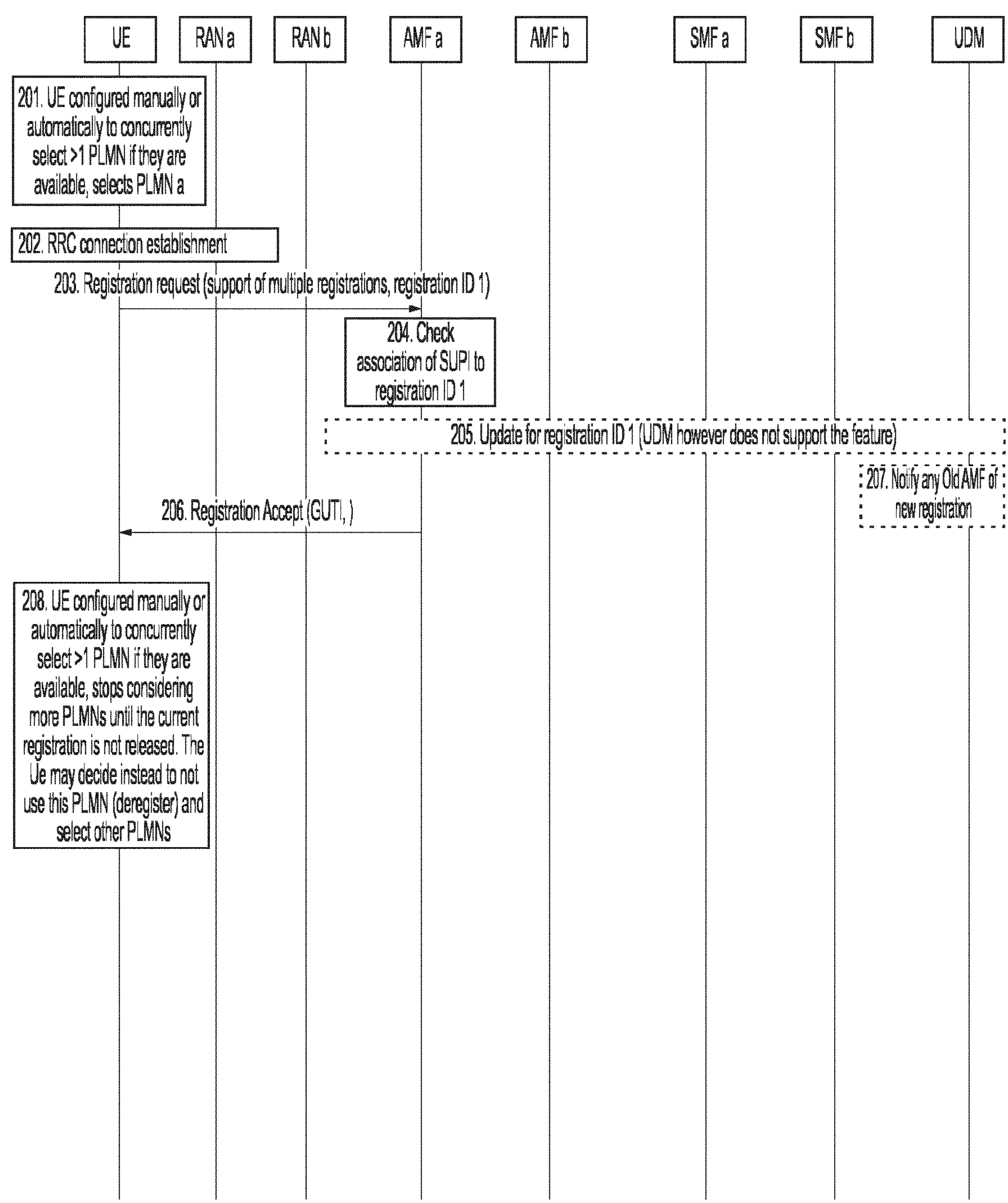
FIG. 2 illustrates an example signaling diagram, according to an embodiment.

FIG. 2 illustrates a signaling diagram depicting an example in which the UDM does not support multiple registrations. In particular, the example of FIG. 2 depicts a case where the UDM of HPLMN does not support multiple registrations. As illustrated at 201, the UE may be configured manually or automatically to concurrently select more than one PLMN if they are available. In this example, the UE may select PLMN a. At 202, RRC connection establishment may be performed between the UE and RAN a. As further illustrated in the example of FIG. 2, at 203, the UE may transmit, to AMF a, a registration request message indicating the UE's support for multiple registrations per USIM/access type and a registration ID 1. At 204, AMF a may check the association of SUPI to registration ID 1. In other words, AMF a may check whether a context for the SUPI exists for registration ID 1. If the context already exists, then AMF a does not need to contact the UDM and AMF a keeps a context for the SUPI per registration ID. However, if AMF a does not have a previous context for the UE with registration ID 1, then, at 205, AMF a may transmit an update to the UDM with registration ID 1 and detects whether the UDM supports multiple registrations. In the example of FIG. 2, the UDM does not support multiple registrations and, since the UDM does not support multiple registrations, then AMF a may act as if it also does not support multiple registrations.

As further illustrated in the example of FIG. 2, AMF a may transmit to the UE, at 206, a registration accept message including GUTI, but without registration ID 1 since the UDM does not support multiple registrations. As shown at 207 of FIG. 2, the UDM may notify any old AMF(s) of the new registration. As further depicted in the example of FIG. 2, at 208, the UE may stop considering other PLMNs or may release the registration with this PLMN a and proceed to select other PLMNs (based on policy or user settings and preferences). It is noted that, in some embodiments, this case may not be needed if the UE is configured by the HPLMN to enable multiple PLMNs registrations (i.e., the capability is switched on by the Home PLMN by configuration) in which case a further configuration step may be needed whereby the HPLMN provides the UE with the necessary configuration to enable the UE to select simultaneously more than one PLMN or NPN, and also some priorities and preferences. This can be done via steering of roaming (SoR) or UE parameters configuration update or both, as shown in the example of FIG. 3 discussed below.

As described above, FIG. 2 is provided as one example. However, other examples are possible, according to some embodiments.

Figure 3:
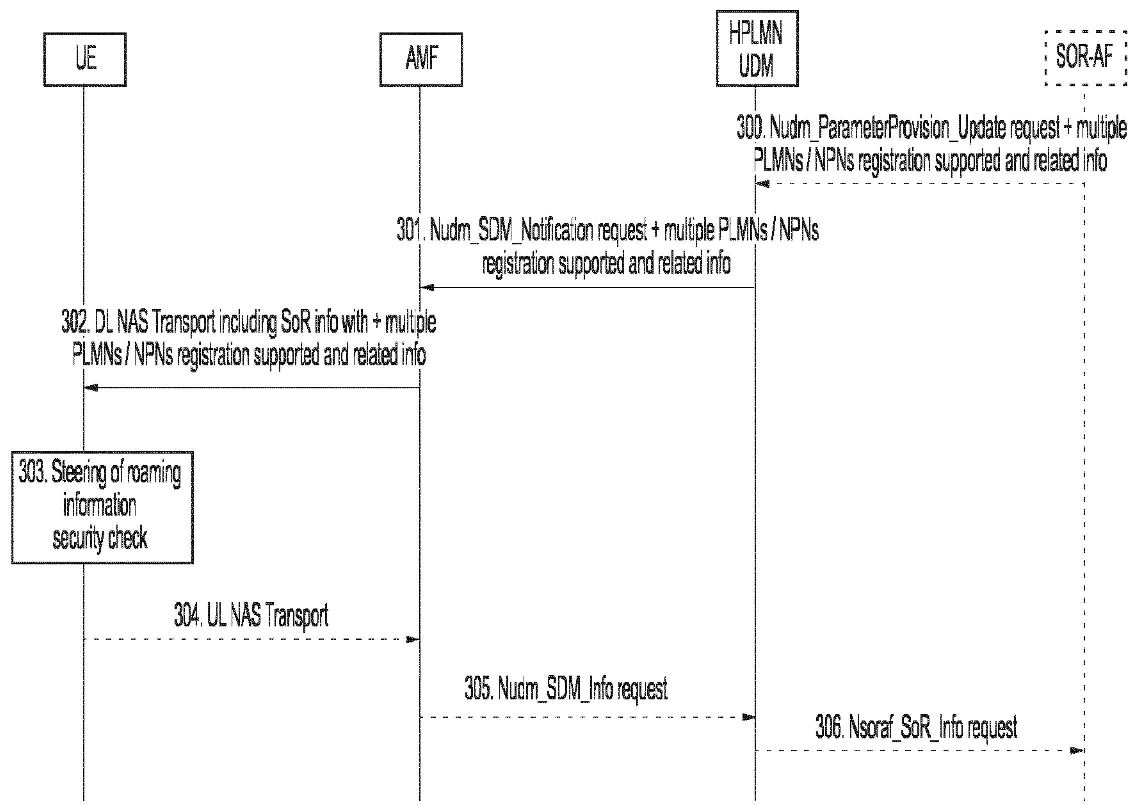
FIG. 3 illustrates an example signaling diagram, according to an embodiment.

FIG. 3 illustrates another example signaling diagram, according to certain embodiments. In the example of FIG. 3, HPLMN includes the information related to multiple simultaneous PLMNs/NPNs registrations. The example of FIG. 3 depicts SoR procedure but other procedures may also be used, such as the UE parameters update procedure.

As illustrated in the example of FIG. 3, at 300, a SOR application function (AF) may transmit an update request message (e.g., Nudm_ParameterProvision_Update request) to the HPLMN UDM. In an embodiment, the update request message may include an indication that multiple PLMNs/NPNs registration is supported along with related information. The HPLMN UDM may transmit to the AMF, at 301, a notification request message (e.g., Nudm_SDM_Notification request) to indicate that multiple PLMNs/NPNs registration is supported and the related information. At 302, the AMF may transmit, to the UE, a DL NAS transport message including SoR information with an indication that multiple PLMNs/NPNs registration is supported along with the related information. According to certain embodiments, the information that the HPLMN may provide to the UE can include: (1) activation of multiple registrations in the UE; (2) an indication of PLMNs and/or NPNs that can support multiple registrations and any priorities, preferences and pairings, groupings of PLMNs/NPNs allowed and/or disallowed; and/or (3) an indication of whether selection of one or more PLMN not indicated in (2) is allowed.

Then, at 303, the UE may perform steering of roaming information security check and, at 304, the UE may transmit an UL NAS transport message to the AMF. The AMF may, at 305, transmit an information request (e.g., Nudm_SDM_Info request) to the HPLMN UDM and, at 306, the HPLMN UDM may transmit a SoR information request (e.g., Nsoraf_SoF_Info request) to the SOR-AF.

In the example embodiment of FIG. 3, the UDM is assumed by the UE to support multiple registrations. As such, this means that lack of support indication by a PLMN or NPN means that the AMFs in the PLMN or NPN does not support the feature to handle the registration ID. This can enable the UE to have configuration of multiple registrations per access type, where one of the registrations is with a PLMN or NPN that does not support the feature as the UDM can still support at most one registration per access type without a registration ID. This also means that the UE can select at least one PLMN or NPN that was not indicated to the UE.

As described above, FIG. 3 is provided as one example. However, other examples are possible, according to some embodiments. For instance, as another example embodiment, the HPLMN may include the information related to multiple simultaneous PLMNs/NPNs registrations in the USIM that is provided to the subscriber.

Figure 4:
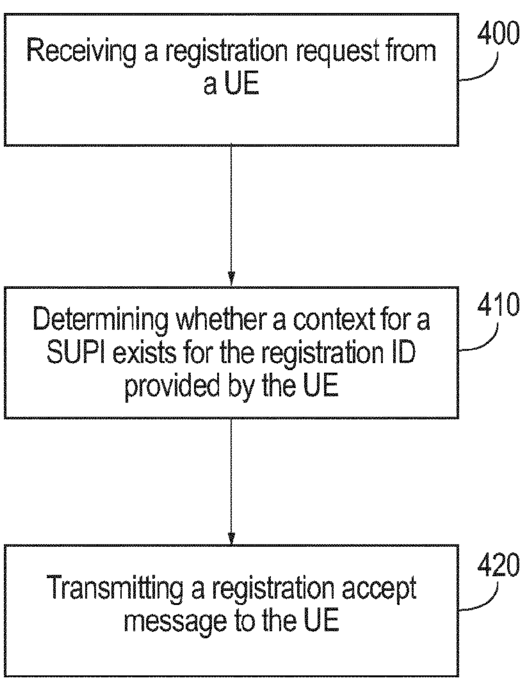
FIG. 4 illustrates an example flow diagram of a method, according to an embodiment.

FIG. 4 illustrates an example flow diagram of a method for enabling a UE to register with multiple PLMNs and/or NPNs using the same access type, according to an example embodiment. In certain example embodiments, the flow diagram of FIG. 4 may be performed by a network entity or network node in a communications system, such as LTE or 5G NR. In some example embodiments, the network entity performing the method of FIG. 4 may include or be included in a base station, access node, node B, eNB, gNB, NG-RAN node, transmission-reception points (TRPs), high altitude platform stations (HAPS), relay station or the like. In one embodiment, the network node performing the method of FIG. 4 may include an access node or AMF, such as any of the AMFs illustrated in the examples of FIGS. 1-3 or similar radio node. Therefore, the method of FIG. 4 may include one or more operations illustrated in the examples of FIGS. 1-3.

As illustrated in the example of FIG. 4, the method may include, 400, receiving, at an access node of a network, such as an AMF, a registration request from a UE. According to certain embodiments, the registration request may include a registration ID for the registration to the network. In one embodiment, the inclusion of the registration ID in the registration request may implicitly indicate that the UE is capable of registering, using one credential (e.g., USIM), with more than one network using the same access type. Thus, in one example, the UE from which the registration request is received may be enabled to perform simultaneous registrations for the same access type for more than one PLMN and/or NPN, e.g., based on user settings or configurations. Alternatively, in certain embodiments, the registration request may also include, in addition to the registration ID, an explicit indication of the UE's capability to register, using one credential (e.g., USIM), with more than one network using the same access type.

According to an embodiment, the method of FIG. 4 may include, at 410, determining whether a context for a SUPI exists for the registration ID provided by the UE. In an embodiment, the method may include keeping a context for the SUPI per registration ID. If it is determined at 410 that a context for the SUPI already exists for the registration ID, then there is no need to contact a UDM. If it is determined at 410 that there is not already a context for the registration ID, the method may include reporting the registration to a UDM with the registration ID provided by the UE. In an embodiment, the method may include checking whether the UDM supports simultaneous registration with more than one network using the same access type. If the UDM does not support the simultaneous registration with more than one network using the same access type, then the access node or AMF may also act as if it does not support simultaneous registration.

In certain embodiments, the method of FIG. 4 may include, at 420, transmitting a registration accept message to the UE. According to one embodiment, the registration accept message may include a confirmation of the registration to the network with a GUTI for the registration and the registration identifier. According to an embodiment, the registration accept message may also additionally include an explicit indication that the access node or AMF supports simultaneous registration with more than one network using the same access type.

FIG. 4 is provided as one example of a method, according to certain embodiments. Other examples are possible as one or more procedures discussed above or illustrated in FIG. 4 may be skipped or may be performed in a different order, or additional procedures may be added.

Figure 5:
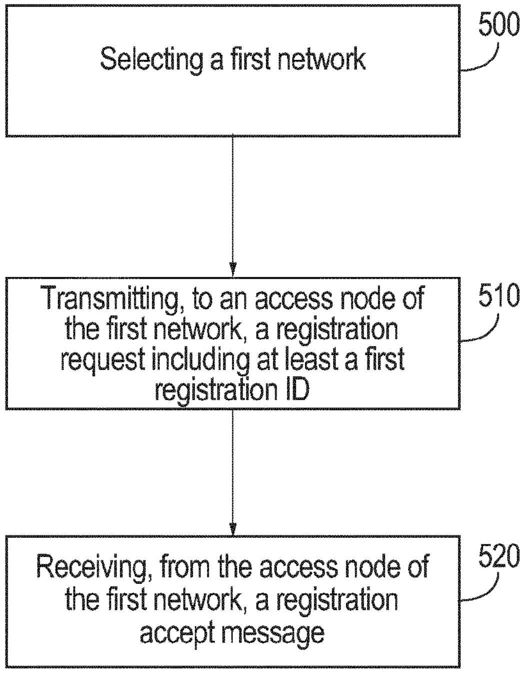
FIG. 5 illustrates an example flow diagram of a method, according to an embodiment.

FIG. 5 illustrates an example flow diagram of a method for a UE to register with multiple PLMNs and/or NPNs using the same access type, according to one example embodiment. In certain example embodiments, the flow diagram of FIG. 5 may be performed by a network entity or network node in a communications system, such as LTE or 5G NR. For instance, in some example embodiments, the network entity performing the method of FIG. 5 may include a UE, SL UE, mobile station, IoT device, UE type of road side unit (RSU), other device, or the like. In one embodiment, the network node performing the method of FIG. 5 may include a UE, such as the UE illustrated in the examples of FIGS. 1-3, or similar device. Therefore, the method of FIG. 5 may include one or more operations illustrated in the examples of FIGS. 1-3. In an embodiment, the UE may be configured to run simultaneous registrations for the same access type for more than one network.

As illustrated in the example of FIG. 5, the method may include, 500, selecting, by the UE, a first network, such as a PLMN or NPN. According to an embodiment, the UE may be configured to be able to simultaneously register, using one credential (e.g., USIM), with more than one network using the same access type. The method may then include establishing a RRC connection with the selected network. In one embodiment, the method of FIG. 5 may include, at 510, transmitting, to an access node of the first network (e.g., an AMF), a registration request including at least a first registration ID for the registration to the first network. In one embodiment, the inclusion of the registration ID in the registration request may also implicitly indicate that the UE is capable of registering, using one credential (e.g., USIM), with more than one network using the same access type. Therefore, in certain example embodiments, the registration request indicates that the UE supports multiple registrations per credential (USIM)/access type and provides a registration ID, where the registration ID is per access type (e.g., if the UE moves from one access type to another in the same PLMN, it may use a different registration ID in the different access types). Alternatively, the registration request may also include, in addition to the registration ID, an explicit indication of the UE's capability to register, using one credential (e.g., USIM), with more than one network using the same access type.

In certain embodiments, the method of FIG. 5 may include, at 520, receiving, from the access node of the first network (e.g., AMF), a registration accept message. According to one embodiment, the registration accept message may include an indication that the access node of the first network (e.g., AMF) supports simultaneous registration with more than one network using the same access type and a confirmation of the registration to the first network with a GUTI for the registration and the first registration ID. In an embodiment, the method may then include performing PDU session establishment with the first network using the first registration ID.

According to a further embodiment, if the access node (e.g. AMF) and/or UDM does not support simultaneous registration with more than one network using the same access type, then the registration accept message does not include the first registration ID, and the method may include stopping considering registration with other networks and/or releasing registration with the first network and selecting another network.

In certain embodiments, the method may further include selecting, by the UE, a second network, and then transmitting, to an access node of the second network, a registration request including an indication of the user equipment's capability to register with more than one network using the same access type and a second registration ID for the registration to the second network. The method may also include receiving, from the access node of the second network, a registration accept message. In one embodiment, the registration accept message may include an indication that the access node of the second network supports simultaneous registration with more than one network using the same access type and a confirmation of the registration to the second network with a GUTI for the registration and the second registration ID. According to an embodiment, the method may also include performing PDU session establishment with the second network using the second registration ID.

According to a further embodiment, if the access node (e.g. AMF) of the second network and/or UDM does not support simultaneous registration with more than one network using the same access type, then the registration accept message received from the access node of the second network does not include the second registration identifier, and the method may include stopping considering registration with other networks, and/or releasing registration with the second network and selecting another network.

In some embodiments, the method may include receiving, from a HPLMN, a configuration to enable the UE to simultaneously select more than one network and any priorities associated with the networks. For example, the configuration may include one or more of: activation of multiple registrations in the UE; an indication of networks that can support multiple registrations, their priorities, preferences or pairings, and groupings of networks that are allowed or disallowed; and whether a selection, by the UE, of at least one network not included in said indication of networks is allowed. In one example embodiment, the receiving of the configuration may include receiving the configuration via steering of roaming (SoR) information.

According to an embodiment, if the UE is configured by the HPLMN to activate the multiple registration per access type, then the UE may assume that the UDM supports multiple registration per access type. In this case, if the UE receives the registration accept message without the registration ID, it would mean that the AMF does not support the multiple registration per access type. This can enable the UE to have configuration of multiple registrations per access type, where one of the registrations is with a PLMN or NPN that does not support multiple registrations as the UDM can still support a registration per access type without a registration ID.

According to certain embodiments, the first network may include a PLMN and/or a NPN, and the second network may include a PLMN or a NPN. In some embodiments, the registration ID may also be included in session management messages (e.g., in the event that the two PLMN/NPN provided access to the same network in the HPLMN/HNPN).

FIG. 5 is provided as one example of a method, according to certain embodiments. Other examples are possible as one or more procedures discussed above or illustrated in FIG. 5 may be skipped or may be performed in a different order, or additional procedures may be added.

Figure 6:
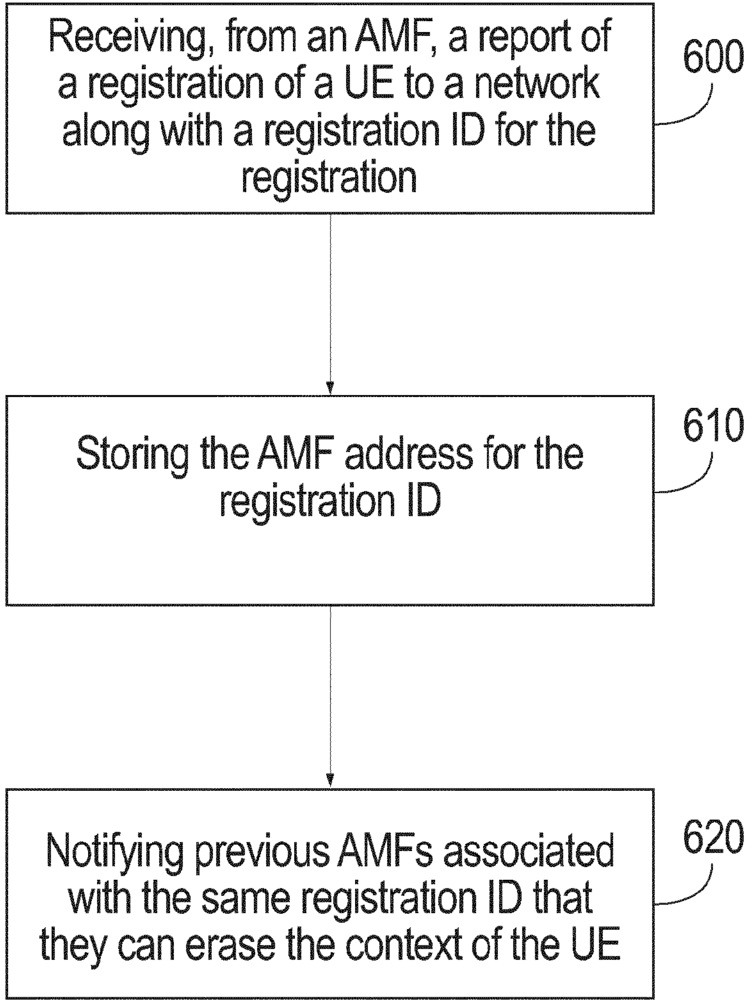
FIG. 6 illustrates an example flow diagram of a method, according to an embodiment.

FIG. 6 illustrates an example flow diagram of a method for enabling a UE to register with multiple PLMNs and/or NPNs using the same access type, according to an example embodiment. In certain example embodiments, the flow diagram of FIG. 6 may be performed by a network entity or network node in a communications system, such as LTE or 5G NR. In some example embodiments, the network entity performing the method of FIG. 6 may include or be included in a base station, access node, node B, eNB, gNB, NG-RAN node, transmission-reception points (TRPs), high altitude platform stations (HAPS), relay station or the like. In one embodiment, the network node performing the method of FIG. 6 may include a UDM, such as the UDM illustrated in the examples of FIGS. 1-3 or similar radio node. Therefore, the method of FIG. 6 may include one or more operations illustrated in the examples of FIGS. 1-3.

As illustrated in the example of FIG. 6, the method may include, 600, receiving, from an AMF, a report of a registration of a UE to a network (e.g., PLMN or NPN) with a registration ID for the registration. The method may then include, at 610, storing the AMF address for the registration ID. The method may also include, at 620, notifying previous access nodes (e.g., AMFs) associated with the same registration ID that they can erase the context of the UE.

FIG. 6 is provided as one example of a method, according to certain embodiments. Other examples are possible as one or more procedures discussed above or illustrated in FIG. 6 may be skipped or may be performed in a different order, or additional procedures may be added.

FIG. 7A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), WLAN access point, TRP, IAB node, and/or HAPS, associated with a radio access network, such as a LTE network, 5G or NR. In example embodiments, apparatus 10 may be NG-RAN node, an eNB in LTE, or gNB in 5G. According to one embodiment, apparatus 10 may be or may include an access node or AMF, for example.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7A.

As illustrated in the example of FIG. 7A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a NW node or RAN node, such as a base station, access point, Node B, eNB, gNB, WLAN access point, or the like. In one embodiment, apparatus 10 may be an access node or AMF of a network, or the like. For example, in some embodiments, apparatus 10 may be configured to perform one or more of the processes depicted in any of the flow charts or signaling diagrams described herein, such as those illustrated in FIGS. 1-6. In some embodiments, as discussed herein, apparatus 10 may be configured to perform a procedure relating to enabling or facilitating a UE to register with multiple PLMNs and/or NPNs using the same access type, as described elsewhere herein, for instance.

FIG. 7B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like. It should be noted that one of ordinary skill in the art would understand that apparatus 20 may include components or features not shown in FIG. 7B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7B.

As illustrated in the example of FIG. 7B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a UE, communication node, mobile equipment (ME), mobile station, mobile device, stationary device, IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as that illustrated in FIGS. 1-6. Thus, according to an embodiment, apparatus 20 may be configured to perform a procedure relating to enabling a UE to register with multiple PLMNs and/or NPNs using the same access type, as discussed elsewhere herein, for instance.

FIG. 7C illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in a UDM, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 7C.

As illustrated in the example of FIG. 7C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 7C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be or may be included in a UDM, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 1-6. According to certain example embodiments, apparatus 30 may be configured to perform a procedure relating to enabling a UE to register with multiple PLMNs and/or NPNs using the same access type, as described elsewhere herein, for instance.

In some embodiments, an apparatus (e.g., apparatus 10 and/or apparatus 20 and/or apparatus 30) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide ways to enable a UE to register with multiple PLMNs and/or NPNs using the same access type. As a result of some example embodiments, it is now possible to register, with one credential or USIM, with more than one network using the same 3GPP access type. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. A method, comprising:

selecting, by a user equipment configured with a capability to simultaneously register, using one credential, with more than one network using a same access type, a first network of the more than one network to register with;

transmitting, by the user equipment, to an access management function of the first network, using a first access type, a first registration request message for registering the user equipment to the first network, the first registration request message comprising a first registration identifier, wherein the first registration identifier indicates that a registration of the user equipment to the first network is a first registration of the user equipment using the first access type;

receiving, by the user equipment, from the access management function of the first network, a first registration accept message, wherein the first registration accept message comprises a globally unique temporary identifier (GUTI) for the registration to the first network, and the first registration identifier;

transmitting, by the user equipment, to an access management function of a second network, using the first access type, after the receiving the first registration accept message and while registered to the first network, a second registration request message for registering the user equipment to the second network, the second registration request message comprising an indication of the capability and a second registration identifier, wherein the second registration identifier indicates that a registration of the user equipment to the second network is a second registration of the user equipment using the first access type; and receiving, by the user equipment, from the access management function of the second network, a second registration accept message.

2. The method of claim 1, wherein the first registration request message further comprises an indication of the capability.

3. The method of claim 1, wherein the first registration accept message further comprises an indication that the access management function of the first network supports simultaneous registration of the user equipment with the more than one network using the same access type.

4. The method of claim 1, further comprising initiating session establishment with the first network using the first registration identifier.

5. The method of claim 1, wherein the second registration accept message comprises a globally unique temporary identifier (GUTI) for the registration of the user equipment to the second network and the second registration identifier.

6. The method of claim 5, wherein the second registration accept message further comprises an indication that the access management function of the second network supports simultaneous registration of the user equipment with the more than one network using the same access type.

7. The method of claim 5, further comprising initiating second session establishment with the second network using the second registration identifier.

8. A user equipment comprising:

at least one processor; and at least one memory including instructions which, when executed by the at least one processor, cause the user equipment configured with a capability to simultaneously register, using one credential, with more than one network using a same access type at least to perform:

selecting a first network of the more than one network to register with;

transmitting, to an access management function of the first network, using a first access type, a first registration request message for registering the user equipment to the first network, the first registration request message comprising a first registration identifier, wherein the first registration identifier indicates that a registration of the user equipment to the first network is a first registration of the user equipment using the first access type;

receiving, from the access management function of the first network, a registration accept message, wherein the first registration accept message comprises a globally unique temporary identifier (GUTI) for the registration to the first network, and the first registration identifier;

transmitting, to an access management function of a second network, using the first access type, after the receiving the first registration accept message and while registered to the first network, a second registration request message for registering the user equipment to the second network, the second registration request message comprising an indication of the capability and a second registration identifier, wherein the second registration identifier indicates that a registration of the user equipment to the second network is a second registration of the user equipment using the first access type; and receiving, from the access management function of the second network, a second registration accept message.

9. The apparatus of claim 8, wherein the first registration request message further comprises an indication of the capability.

10. The apparatus of claim 8, wherein the first registration accept message further comprises an indication that the access management function of the first network supports simultaneous registration of the user equipment with the more than one network using the same access type.

11. The apparatus of claim 8, wherein the instructions, when executed by the at least one processor, further cause the apparatus at least to initiate session establishment with the first network using the first registration identifier.

12. The apparatus of claim 8, wherein instructions, when executed by the at least one processor, further cause the apparatus at least to initiate second session establishment with the second network using the second registration identifier.

13. A computer readable medium comprising program instructions stored thereon, which when executed by at least one processor of a user equipment configured with a capability to simultaneously register, using one credential, with more than one network using a same access type, cause the user equipment at least to perform:

selecting a first network of the more than one network to register with;

transmitting, to an access management function of the first network, using a first access type, a first registration request message for registering the user equipment to the first network, the first registration request message comprising a first registration identifier, wherein the first registration identifier indicates that a registration of the user equipment to the first network is a first registration of the user equipment using the first access type;

receiving, from the access management function of the first network, a registration accept message, wherein the first registration accept message comprises a globally unique temporary identifier (GUTI) for the registration to the first network, and the first registration identifier;

transmitting, to an access management function of a second network, using the first access type, after the receiving the first registration accept message and while registered to the first network, a second registration request message for registering the user equipment to the second network, the second registration request message comprising an indication of the capability and a second registration identifier, wherein the second registration identifier indicates that a registration of the user equipment to the second network is a second registration of the user equipment using the first access type; and receiving, from the access management function of the second network, a second registration accept message.

14. The computer readable medium of claim 13, wherein the first registration request message further comprises an indication of the capability.

15. The computer readable medium of claim 13, wherein the first registration accept message further comprises an indication that the access management function of the first network supports simultaneous registration of the user equipment with the more than one network using the same access type.

16. The computer readable medium of claim 13, wherein the program instructions, when executed by at least one processor, further cause the user equipment at least to perform:

initiating session establishment with the first network using the first registration identifier.

17. The computer readable medium of claim 13, wherein the second registration accept message comprises a globally unique temporary identifier (GUTI) for the registration of the user equipment to the second network and the second registration identifier.

18. The computer readable medium of claim 17, wherein the second registration accept message further comprises an indication that the access management function of the second network supports simultaneous registration of the user equipment with the more than one network using the same access type.

19. The method of claim 18, wherein the program instructions, when executed by at least one processor, further cause the user equipment at least to perform:

initiating second session establishment with the second network using the second registration identifier.

20. The apparatus of claim 8, wherein the second registration accept message comprises a globally unique temporary identifier (GUTI) for the registration of the user equipment to the second network and the second registration identifier.

21. The apparatus of claim 20, wherein the second registration accept message further comprises an indication that the access management function of the second network supports simultaneous registration of the user equipment with the more than one network using the same access type.

* * * * *